(12) United States Patent
Bastide et al.

(10) Patent No.: US 11,914,733 B2
(45) Date of Patent: Feb. 27, 2024

(54) TIMING FOR USER DATA ERASURE REQUESTS

(71) Applicant: INTERNATIONAL BUSINESS MACHINES CORPORATION, Armonk, NY (US)

(72) Inventors: Paul R. Bastide, Ashland, MA (US); Shakil Manzoor Khan, Highland Mills, NY (US); Senthil Bakthavachalam, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 395 days.

(21) Appl. No.: 17/154,016

(22) Filed: Jan. 21, 2021

(65) Prior Publication Data

US 2022/0229921 A1    Jul. 21, 2022

(51) Int. Cl.
  *G06F 21/31*    (2013.01)
  *G06F 21/62*    (2013.01)
  (Continued)

(52) U.S. Cl.
  CPC .......... *G06F 21/6218* (2013.01); *G06F 18/22* (2023.01); *G06F 21/31* (2013.01); *G06F 21/604* (2013.01); *G06F 2221/2143* (2013.01)

(58) Field of Classification Search
  CPC .... G06F 21/6218; G06F 21/31; G06F 21/604; G06F 18/22; G06F 2221/2143
  (Continued)

(56) References Cited

U.S. PATENT DOCUMENTS

| 7,702,640 B1 * | 4/2010 | Vermeulen | G06F 16/2246 |
| | | | 707/999.1 |
| 10,043,035 B2 | 8/2018 | Lafever et al. | |

(Continued)

FOREIGN PATENT DOCUMENTS

| GB | 2561241 A1 | 10/2018 |
| JP | 2005107856 A * | 4/2005 |

(Continued)

OTHER PUBLICATIONS

Liu, Hongju. "Remote intelligent medical monitoring system based on Internet of Things." In 2016 International Conference on Smart Grid and Electrical Automation (ICSGEA), pp. 42-45. IEEE, 2016. (Year: 2016).*

(Continued)

*Primary Examiner* — Luu T Pham
*Assistant Examiner* — Walter J Malinowski
(74) *Attorney, Agent, or Firm* — CANTOR COLBURN LLP; Aaron Pontikos (57) ABSTRACT

Aspects of the invention include receiving a data erasure request associated with a user and identifying, based at least in part on the data erasure request, an entity associated with the user and one or more identifiers for the user. Aspects also include identifying, based at least in part on the one or more identifiers for the user, a cohort that includes the user and comparing the one or more identifiers for the user to identifiers of a plurality of users that are not members of the cohort. Aspects further include identifying a replacement user from the plurality of users based on the comparison and replacing the entity associated with the user in the cohort with an entity associated with the replacement user.

8 Claims, 6 Drawing Sheets

(51) Int. Cl.
*G06F 21/60* (2013.01)
*G06F 18/22* (2023.01)

(58) Field of Classification Search
USPC .......................................................... 726/26
See application file for complete search history.

(56) References Cited

U.S. PATENT DOCUMENTS

| | | | |
|---|---|---|---|
| 2002/0138572 A1* | 9/2002 | Delany | H04L 67/564 709/204 |
| 2002/0156879 A1* | 10/2002 | Delany | H04L 63/102 709/229 |
| 2004/0010791 A1* | 1/2004 | Jain | G06F 9/542 719/318 |
| 2007/0043774 A1* | 2/2007 | Davis | G06F 18/41 |
| 2008/0086612 A1* | 4/2008 | Murayama | G06F 21/604 711/163 |
| 2008/0231750 A1* | 9/2008 | Suzuki | H04N 21/235 348/E5.005 |
| 2013/0007892 A1* | 1/2013 | Inooka | G06F 21/10 726/27 |
| 2014/0123053 A1* | 5/2014 | Nakada | G06F 3/04845 715/778 |
| 2014/0189796 A1* | 7/2014 | Mashimo | H04L 63/08 726/3 |
| 2016/0055501 A1* | 2/2016 | Mukherjee | G06Q 10/10 705/7.34 |
| 2017/0103232 A1 | 4/2017 | Scaiano et al. | |
| 2018/0005035 A1* | 1/2018 | Bogolea | B25J 11/008 |
| 2019/0043289 A1* | 2/2019 | Cahill | G07C 9/00309 |
| 2019/0156302 A1* | 5/2019 | Tonio | G06Q 20/40 |
| 2019/0188406 A1* | 6/2019 | McKelvie | G06F 21/6218 |
| 2019/0369001 A1* | 12/2019 | Alcorn | G06T 11/206 |
| 2020/0035341 A1* | 1/2020 | Kain | G16H 10/20 |
| 2020/0104395 A1* | 4/2020 | Bhatia | G06N 3/08 |
| 2020/0293933 A1* | 9/2020 | Ghosh | G06N 5/043 |
| 2021/0133498 A1* | 5/2021 | Zhang | G06F 18/28 |
| 2021/0209708 A1* | 7/2021 | Admon | G06F 16/93 |
| 2022/0035950 A1* | 2/2022 | Wakabayashi | G06F 21/602 |
| 2022/0067306 A1* | 3/2022 | Benger | G06F 40/30 |
| 2022/0216993 A1* | 7/2022 | Lawrence | H04L 9/32 |
| 2023/0110360 A1* | 4/2023 | Sanae | G16H 15/00 705/2 |

FOREIGN PATENT DOCUMENTS

| | | | | |
|---|---|---|---|---|
| JP | 2008123236 A | * | 5/2008 | |
| KR | 20140140309 A | * | 12/2014 | |
| WO | WO-2009128295 A1 | * | 10/2009 | G06Q 10/06 |
| WO | 2019028403 A1 | | 2/2019 | |

OTHER PUBLICATIONS

Kourou. "Cohort harmonization and integrative analysis from a biomedical engineering perspective." IEEE reviews in biomedical engineering 12 (2018): 303-318. (Year: 2018).*
Purushothaman, R. "Reputation-enhanced similarity-based dynamic service discovery framework for service-based applications." In 2014 International Conference on Recent Trends in Information Technology, pp. 1-6. IEEE, 2014. (Year: 2014).*
Bringer, Julien, Hervé Chabanne, and Koen Simoens. "Blackbox security of biometrics." In 2010 Sixth International Conference on Intelligent Information Hiding and Multimedia Signal Processing, pp. 337-340. IEEE, 2010. (Year: 2010).*
Mell, Peter et al. "The NIST Definition of Cloud Computing", Recommendations of the National Institute of Standards and Technology, US Dept. of Commerce, Special Publication 800-145; Sep. 2011, 7 pgs.

* cited by examiner

TIMING FOR USER DATA ERASURE REQUESTS

BACKGROUND

The present invention generally relates to processing user data erasure requests, and more specifically, to control the timing of the processing of user data erasure requests.

The collection and storage of large amounts of data of users to perform a wide variety of analytical tasks have drastically increased in recent times. Such data sets include, but are not limited to, Electronic Medical Records (EMR), or Electronic Health Records, personal web browsing and shopping data, usage data for a personal electronic device, and the like. Today's data storage systems store copious amounts of personal data that can be used to derive valuable population insights from aggregated user data.

The General Data Protection Regulation (GDPR) is a regulation in the European Union (EU) on data protection and privacy in the EU that addresses the collection and usage of personal data. The GDPR was created to give individuals control over their personal data. Many other governments have enacted data protection regulations similar to the GDPR. One common provision of these data protection regulations is the right of a user to request that their personal data be removed from stored data sets.

SUMMARY

Embodiments of the present invention are directed to a computer-implemented method for processing user data erasure requests. A non-limiting example of the computer-implemented method includes receiving a data erasure request associated with a user and identifying, based at least in part on the data erasure request, an entity associated with the user and one or more identifiers for the user. The method also includes identifying, based at least in part on the one or more identifiers for the user, a cohort that includes the user and comparing the one or more identifiers for the user to identifiers of a plurality of users that are not members of the cohort. The method further includes identifying a replacement user from the plurality of users based on the comparison and replacing the entity associated with the user in the cohort with an entity associated with the replacement user.

Embodiments of the present invention are directed to a system processing user data erasure requests. A non-limiting example of the system includes a processor communicative coupled to a memory, the processor operable to receive a data erasure request associated with a user and identify, based at least in part on the data erasure request, an entity associated with the user and one or more identifiers for the user. The processor also operable to identify, based at least in part on the one or more identifiers for the user, a cohort that includes the user and compare the one or more identifiers for the user to identifiers of a plurality of users that are not members of the cohort. The processor further operable to identify a replacement user from the plurality of users based on the comparison and replace the entity associated with the user in the cohort with an entity associated with the replacement user.

Embodiments of the invention are directed to a computer program product for processing user data erasure requests, the computer program product comprising a computer readable storage medium having program instructions embodied therewith. The program instructions are executable by a processor to cause the processor to perform a method. A non-limiting example of the method includes receiving a data erasure request associated with a user and identifying, based at least in part on the data erasure request, an entity associated with the user and one or more identifiers for the user. The method also includes identifying, based at least in part on the one or more identifiers for the user, a cohort that includes the user and comparing the one or more identifiers for the user to identifiers of a plurality of users that are not members of the cohort. The method further includes identifying a replacement user from the plurality of users based on the comparison and replacing the entity associated with the user in the cohort with an entity associated with the replacement user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
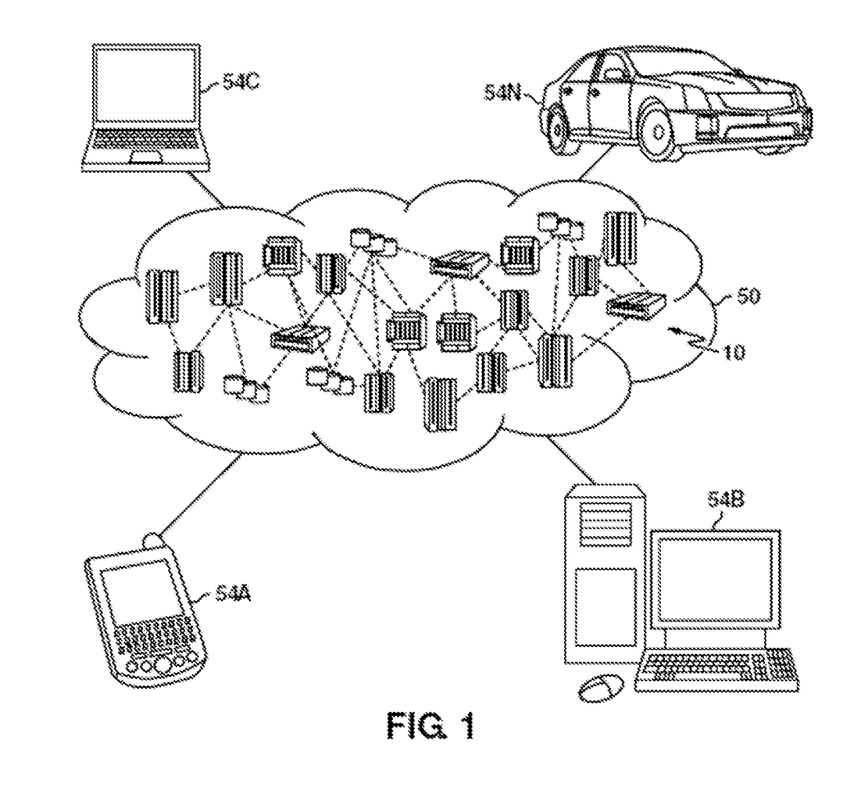
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
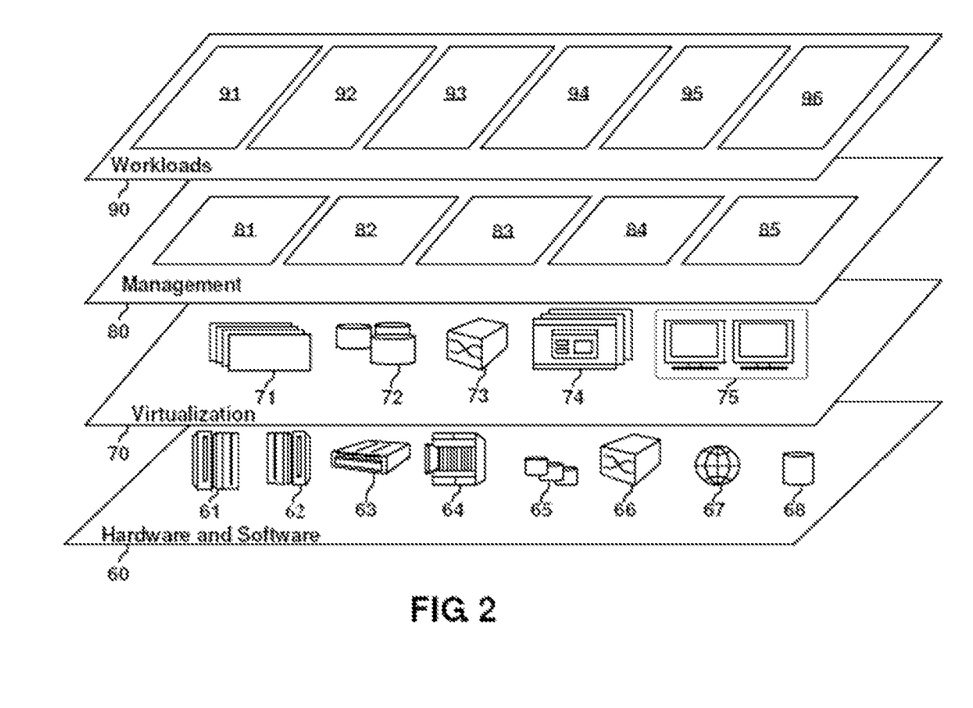
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing user data erasure requests 96.

Figure 3:
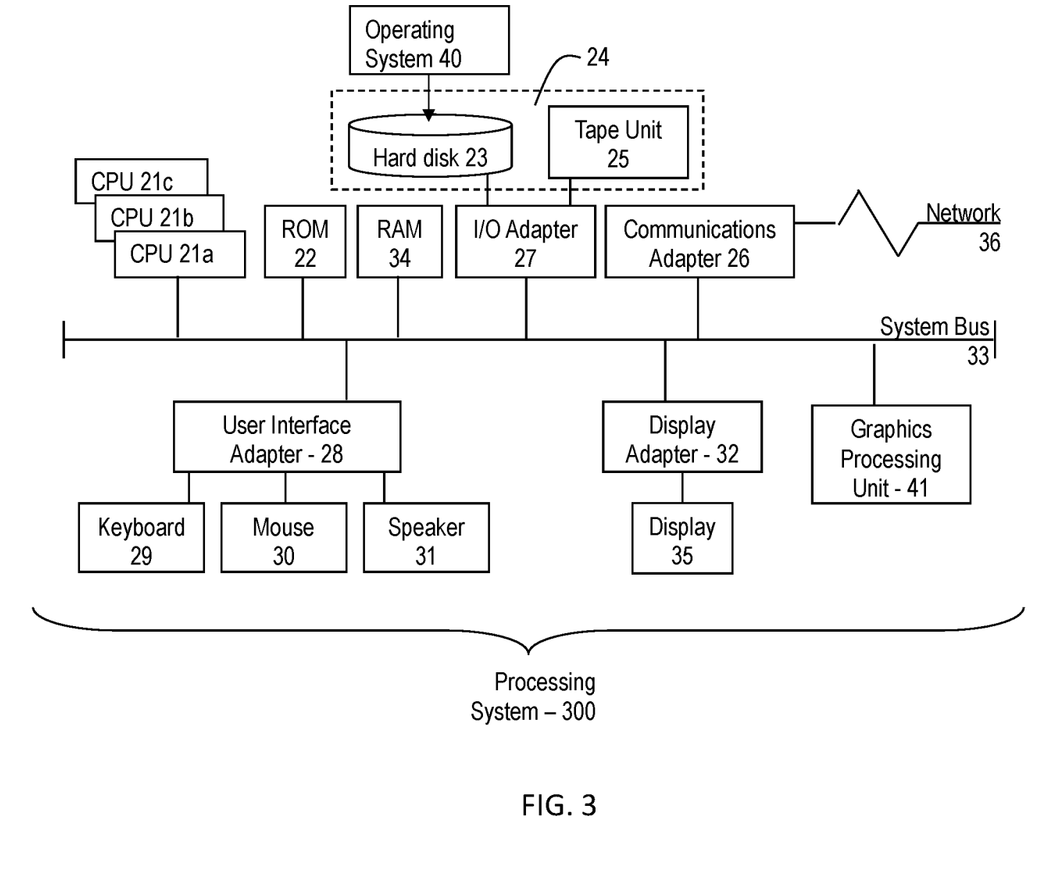
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to an overview of technologies that are more specifically relevant to aspects of the invention, in big data applications, such as a multi-tenant healthcare system, user data is stored in data reservoirs and/or data warehouses for consumption by various applications, such as business intelligence tools. Data reservoirs enable all forms of the customer (e.g., healthcare providers) specific data to be stored in a uniform, single large storage repository for access by a data processing engine. Data reservoirs may be used for multi-dimensional analytics to discover optimal business outcomes. Data reservoirs may be single-tenant, where the data is stored and owned by a single entity, or multi-tenant, where data is stored and owned by multiple entities. Multi-tenant data reservoirs isolate specific tenant data from all other tenants. Multi-tenant data reservoirs may maximize the storage use of a database and provide uniform security and decryption of data. Similarly, a data warehouse is a central repository of integrated data from one or more disparate data sources. They store current and historical data in one single place that are used for creating analytical reports.

In exemplary embodiments, the data reservoirs and/or data warehouses are configured to store data associated with a large number of users. Each user is represented by an entity, or set of records, that includes one or more identifiers of the user, such as demographics of the user. The one or more identifiers can include a user's name, age, address, and other information such as medical conditions, education level, income level, and the like of the user.

In exemplary embodiments, the data processing engines and business intelligence tools are configured to create cohorts, or groups of users, based on the identifiers of the users stored in the data reservoirs and/or data warehouses to derive population insights from aggregated user data. In exemplary embodiments, once cohorts are created, processor-intensive analytics are performed on the cohort to derive the population insights. In exemplary embodiments, a cohort includes a sampling of users that have identifiers that fit into an identified group, such as an age range or a geographic area. In general, the cohort does not include all users that have identifiers that fit into the identified group. In exemplary embodiments, a cohort must have a minimum percentage of the total population size. For example, if the data set includes one thousand users, the cohort must include at least ten percent or one hundred uses. In these cases, a change in the cohort size can shift the statistical significance of analytics performed on the cohort.

Turning now to an overview of the aspects of the invention, one or more embodiments of the invention provide for processing user data erasure requests. In exemplary embodiments, the timing of the processing of data erasure requests is controlled to minimize the impact that the data erasure requests on the population insights from the aggregated user data. In one embodiment, data erasure requests are queued by a data processing engine, which is configured to determine identifiers of the user associated with the erasure request and to identify cohorts the identifiers are members of. The data processing engine is also configured to identifying a suitable replacement user for the cohort and to, if necessary, delay the processing of the data erasure request until a suitable replacement user for the cohort is found. Once a suitable replacement user for the cohort is identified, the data processing engine replaces the user in the cohort and reprocessing downstream usage of the data. In exemplary embodiments, when a user of a cohort is replaced, the data processing engine 402 is configured to notify cohort subscribers, entities that utilize the cohort data, that a replacement has been made.

Figure 4:
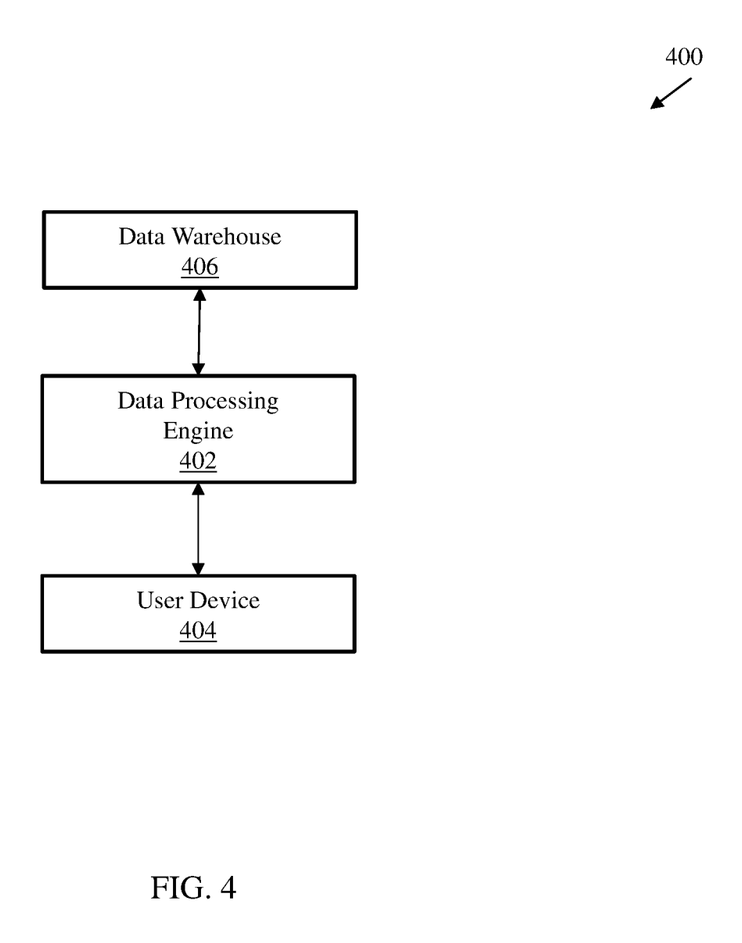
FIG. 4 depicts a system for processing user data erasure requests according to embodiments of the invention.

Turning now to a more detailed description of aspects of the present invention, FIG. 4 depicts a system for processing user data erasure requests according to embodiments of the invention. The system 400 includes a data processing engine 402, a user device 404, and a data warehouse 406. In one or more embodiments of the invention, the data processing engine 402 and the data warehouse 406 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein. The user device 404 can be any type of device that a user may utilize to create and transmit a data erasure request including a smartwatch, smartphone, laptop, and the like.

In exemplary embodiments of the invention, once a data erasure request is received from a user device 404, the data processing engine 402 queues an erasure request and obtains an entity associated with the user. Based on the entity associated with the user, the data processing engine 402 determines one or more identifiers for the user and a cohort that the user is a part of. The data processing engine 402 obtains identifiers for a plurality of users that are not currently part of the cohort and identifies a suitable replacement for the user in the cohort from the plurality of users that are not currently part of the cohort. In exemplary embodiments, the data erasure request remains in the queue until a suitable replacement for the cohort or until a predefined time period has passed. If at the end of the predefined time period, a suitable replacement has not been identified, the best replacement from the available replacements may be placed in the cohort. In exemplary embodiments, delaying the removal process, up to a predefined time period, balances due diligence in quickly complying with the data erasure request with maintaining progress in the cohort.

In exemplary embodiments, the data processing engine 402 identifies a suitable replacement by processing data of users that are not currently part of the cohort to determine whether the user is a match for the cohort. In exemplary embodiments, the pool of users that are considered for replacement of the user in a cohort includes users that have been added to the data set since the cohort was first generated. In exemplary embodiments, the suitable replacement is identified by comparing the identifiers of the user that is being removed and the identifiers of the users being considered. The comparison includes performing a statistical analysis on the identifiers to determine a user that is not part of the cohort that has the highest similarity to the user being removed. Once the replacement user is identified, the user is replaced in the cohort, which triggers downstream reprocessing of the data represented by the cohort. After the user has been replaced in the cohort, the erasure request is completed, and the data of the user is removed from the data warehouse 406.

In some embodiments, a single user may be a part of multiple cohorts and a data erasure request can trigger the replacement of the user in each cohort. In one embodiment, the user is a member of two cohorts and is replaced by different users in each of the two cohorts. This may happen for multiple reasons. For example, the location of the user may have changed during the time period that the data covers, i.e., the user moved from New York to Florida. In another example, the data of the user spans two different age cohorts, i.e., the data of the user covers the time from when the user is 50-65 and the cohorts are ages 50-60 and 61-65.

Figure 5:
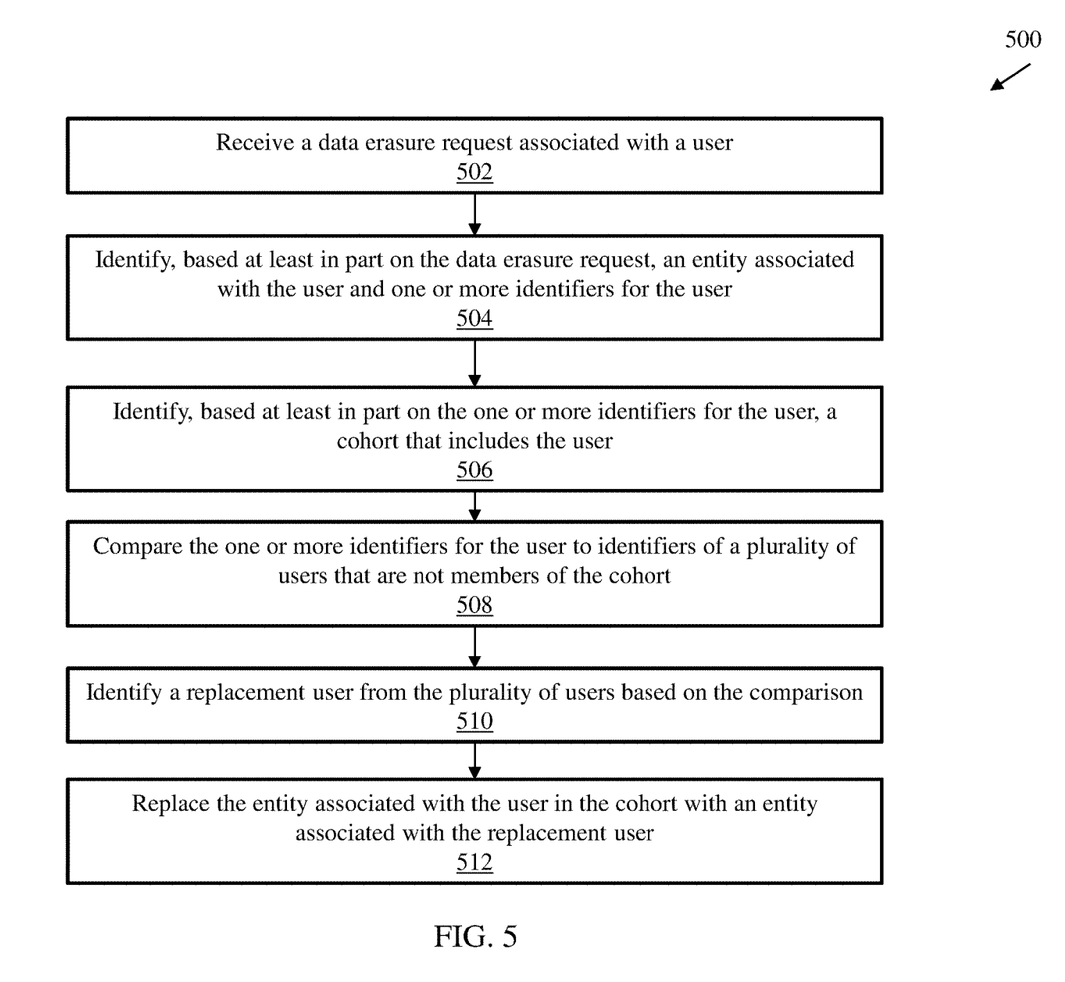
FIG. 5 depicts a flow diagram of a method for processing user data erasure requests according to one or more embodiments of the invention.

FIG. 5 depicts a flow diagram of a method for processing user data erasure requests according to one or more embodiments of the invention. The method 500 includes receiving a data erasure request associated with a user, as shown at block 502. Next, as shown at block 504, the method 500 includes identifying, based at least in part on the data erasure request, an entity associated with the user and one or more identifiers for the user. In exemplary embodiments, the entity is a set of records that contain data regarding the user. Next, as shown at block 506, the method includes identifying, based at least in part on the one or more identifiers for the user, a cohort that includes the user. In one example, the identifiers for the user include demographic information regarding the user, such as age, geographic location, gender and the like. In one embodiment, a cohort is a sampling of users that have an identifier that falls within a predetermined group, such as males, age 20-30, with a location of the northeastern United States.

The method 500 also includes comparing the one or more identifiers for the user to identifiers of a plurality of users that are not members of the cohort, as shown at block 508. In exemplary embodiments, comparing the one or more identifiers for the user to identifiers of the plurality of users that are not members of the cohort includes calculating a similarity score between the user and each of the plurality of users that are not members of the cohort.

In one embodiment, the similarity score is a weighted average comparison between the identifiers of the user to be removed and the identifiers of the user that is not a member of the cohort. For example, the similarity score (S) may be defined as:

$$S = A*(\text{Gender Match}) + B*(\text{Location Match}) + C*(\text{Age Match})$$

where A, B, and C are weighting factors that can be set by a user. Gender Match is a 1 if the gender of the user under consideration matches the user to be replaced and 0 otherwise. Location Match is a number between 1 and 0 that is 1 if the location of the user under consideration is the same as the user to be replaced and decreases as the distance between the locations of the users increase. Age Match is a number between 1 and 0 that is 1 if the age of the user under consideration is the same as the age of the user to be replaced decreases as the difference in age between the users increases. As will be appreciated by those of ordinary skill in the art, other identifiers can also be used in calculating the similarity score Next, as shown at block 510, the method 500 includes identifying a replacement user from the plurality of users based on the comparison. In one embodiment, the replacement user is identified as having the highest similarity score of the calculated similarity scores. The method 500 concludes by replacing the entity associated with the user in the cohort with an entity associated with the replacement user. In exemplary embodiments, replacing the entity associated with the user in the cohort includes completing the data erasure request by deleting the entity associated with the user.

Figure 6:
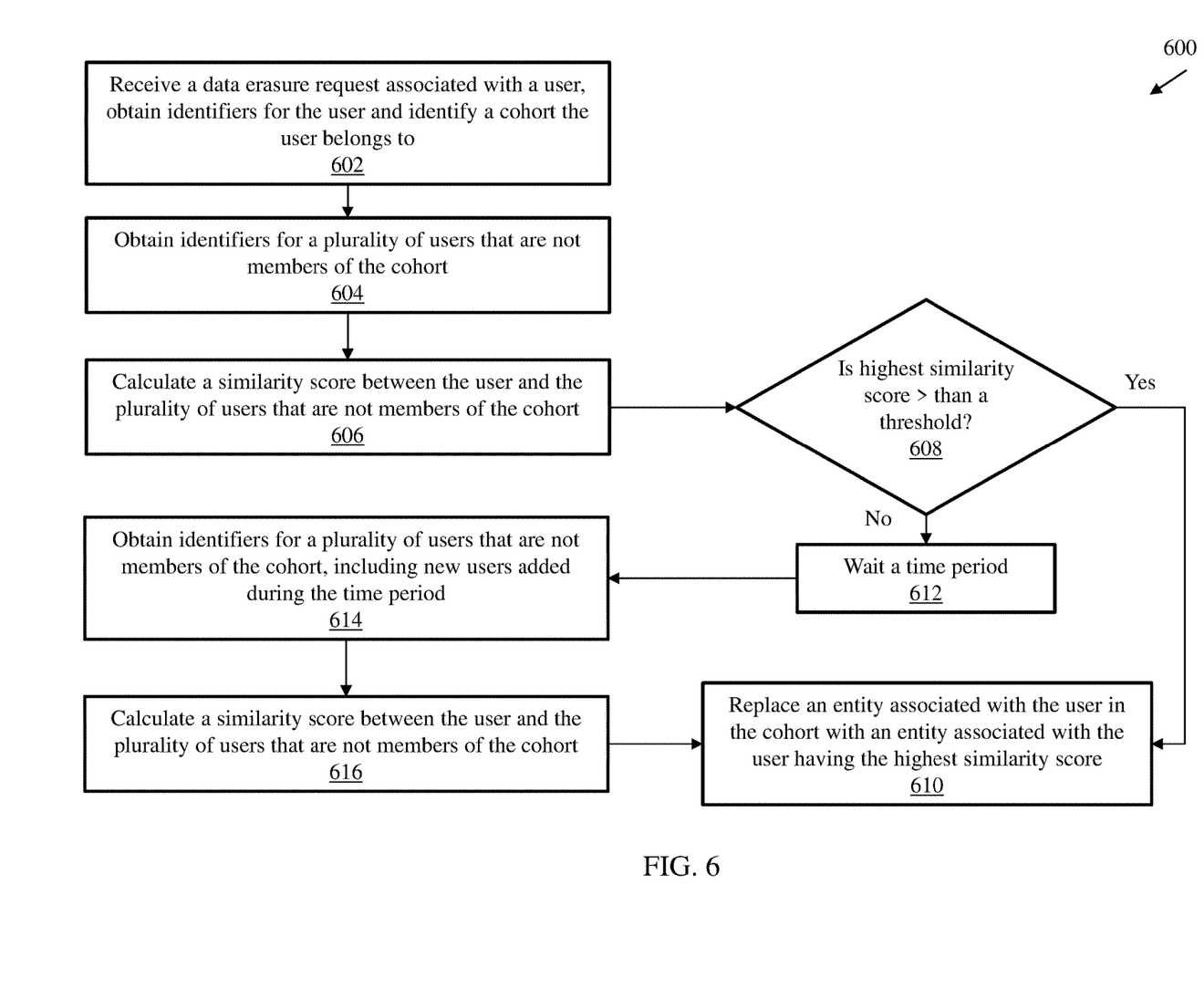
FIG. 6 depicts a flow diagram of another method for processing user data erasure requests according to one or more embodiments of the invention.

FIG. 6 depicts a flow diagram of another method for processing user data erasure requests according to one or more embodiments of the invention. The method 600 includes receiving a data erasure request associated with a user, obtain identifiers for the user, and identify a cohort the user belongs to, as shown at block 602. Next, as shown at block 604, the method 600 includes obtaining identifiers for a plurality of users that are not members of the cohort. The method 600 also includes calculating a similarity score between the user and the plurality of users that are not members of the cohort, as shown at block 606. The method 600 then proceeds to decision block 608 and determines if the highest similarity score is greater than a threshold value. If the highest similarity score is greater than a threshold value, the method 600 proceeds to block 610 and replaces an entity associated with the user in the cohort with an entity associated with the user having the highest similarity score. If the highest similarity score is not greater than a threshold value, the method 600 proceeds to block 612 and waits a time period. After the time period, the method 600 proceeds to block 614 and obtains identifiers for a plurality of users that are not members of the cohort, including new users added during the time period. Next, as shown at block 616, the method 600 includes calculating a similarity score between the user and the plurality of users that are not members of the cohort. The method concludes at block 610 by replacing an entity associated with the user in the cohort with an entity associated with the user having the highest similarity score. In exemplary embodiments, replacing the entity associated with the user in the cohort includes completing the data erasure request by deleting the entity associated with the user. In exemplary embodiments, a duration of the time period is determined based on a statutory requirement for complying with a data erasure request.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of processing user data erasure requests, the method comprising:

receiving, by a hardware processor, a data erasure request associated with a user, wherein the data erasure request is a request to delete all records associated with the user from a data reservoir;

identifying, by the hardware processor based at least in part on the data erasure request, an entity associated with the user and one or more identifiers for the user;

identifying, by the hardware processor based at least in part on the one or more identifiers for the user, a cohort that includes the user;

comparing, by the hardware processor, the one or more identifiers for the user to identifiers of a plurality of users that are not members of the cohort, wherein comparing the one or more identifiers for the user to identifiers of the plurality of users that are not members of the cohort includes calculating a similarity score between the user and each of the plurality of users that are not members of the cohort;

identifying, by the hardware processor, a replacement user from the plurality of users based on the comparison, wherein the replacement user is identified as having the highest similarity score of the calculated similarity scores;

replacing, by the hardware processor, the entity associated with the user in the cohort with an entity associated with the replacement user, wherein replacing the entity associated with the user in the cohort includes completing the data erasure request by deleting the entity associated with the user and all records associated with the user from the data reservoir; and delaying the replacement of the entity associated with the user in the cohort with the entity associated with the replacement user based on a determination that the similarity score of the replacement user is less than a threshold level, wherein the delay lasts until the similarity score of the replacement user exceeds the threshold level up to a maximum time period from receipt of the data erasure request, wherein similarity scores for newly added users that are not members of the cohort are calculated during the maximum time period.

2. The computer-implemented method of claim 1, further comprising:
re-comparing, by the hardware processor at the end of the time period, the one or more identifiers for the user to identifiers of the plurality of users that are not members of the cohort, wherein the plurality of users include new users added during the time period; and
updating, by the processor, the replacement user based on the re-comparison.

3. The computer-implemented method of claim 1, wherein the time period is determined based on a statutory requirement.

4. A system comprising:
a memory;
a processor communicatively coupled to the memory, the processor configured to:
receive a data erasure request associated with a user, wherein the data erasure request is a request to delete all records associated with the user from a data reservoir;
identify, based at least in part on the data erasure request, an entity associated with the user and one or more identifiers for the user;
identify, based at least in part on the one or more identifiers for the user, a cohort that includes the user;
compare the one or more identifiers for the user to identifiers of a plurality of users that are not members of the cohort, wherein comparing the one or more identifiers for the user to identifiers of the plurality of users that are not members of the cohort includes calculating a similarity score between the user and each of the plurality of users that are not members of the cohort;
identify a replacement user from the plurality of users based on the comparison wherein the replacement user is identified as having the highest similarity score of the calculated similarity scores;
replace the entity associated with the user in the cohort with an entity associated with the replacement user, wherein replacing the entity associated with the user in the cohort includes completing the data erasure request by deleting the entity associated with the user and all records associated with the user from the data reservoir; and
delay the replacement of the entity associated with the user in the cohort with the entity associated with the replacement user based on a determination that the similarity score of the replacement user is less than a threshold level, wherein the delay lasts until the similarity score of the replacement user exceeds the threshold level up to a maximum time period from receipt of the data erasure request,
wherein similarity scores for newly added users that are not members of the cohort are calculated during the maximum time period.

5. The system of claim 4, wherein the processor is further configured to:
re-compare, at the end of the time period, the one or more identifiers for the user to identifiers of the plurality of users that are not members of the cohort, wherein the plurality of users include new users added during the time period; and
update the replacement user based on the re-comparison.

6. The system of claim 4, wherein the time period is determined based on a statutory requirement.

7. A computer program product for healthcare insights comprising a non-transitory computer readable storage medium having program instructions embodied therewith, the program instructions executable by a processor to cause the processor to perform a method comprising:
receiving a data erasure request associated with a user, wherein the data erasure request is a request to delete all records associated with the user from a data reservoir;
identifying, based at least in part on the data erasure request, an entity associated with the user and one or more identifiers for the user;
identifying, based at least in part on the one or more identifiers for the user, a cohort that includes the user;
comparing the one or more identifiers for the user to identifiers of a plurality of users that are not members of the cohort, wherein comparing the one or more identifiers for the user to identifiers of the plurality of users that are not members of the cohort includes calculating a similarity score between the user and each of the plurality of users that are not members of the cohort;
identifying a replacement user from the plurality of users based on the comparison, wherein the replacement user is identified as having the highest similarity score of the calculated similarity scores; and
replacing the entity associated with the user in the cohort with an entity associated with the replacement user, wherein replacing the entity associated with the user in the cohort includes completing the data erasure request by deleting the entity associated with the user and all records associated with the user from the data reservoir; and
delaying the replacement of the entity associated with the user in the cohort with the entity associated with the replacement user based on a determination that the similarity score of the replacement user is less than a threshold level, wherein the delay lasts until the similarity score of the replacement user exceeds the threshold level up to a maximum time period from receipt of the data erasure request,
wherein similarity scores for newly added users that are not members of the cohort are calculated during the maximum time period.

8. The computer program product of claim 7, wherein the method further comprises:
re-comparing, at the end of the time period, the one or more identifiers for the user to identifiers of the plurality of users that are not members of the cohort, wherein the plurality of users include new users added during the time period; and
updating the replacement user based on the re-comparison.

* * * * *